(12) United States Patent
Shu

(10) Patent No.: US 7,025,391 B2
(45) Date of Patent: Apr. 11, 2006

(54) NON-PERMEABLE PIPE CONNECTOR STRUCTURE

(76) Inventor: Wen-Chin Shu, No. 77 Lun Gang Lane, Xia Lun Village, XTu Shui Township, Changhua Hsien (TW)

( * ) Notice: Subject to any disclaimer, the term of this patent is extended or adjusted under 35 U.S.C. 154(b) by 49 days.

(21) Appl. No.: 10/862,329

(22) Filed: Jun. 8, 2004

(65) Prior Publication Data

US 2005/0275220 A1 Dec. 15, 2005

(51) Int. Cl.
*F16L 27/00* (2006.01)
*F16C 33/58* (2006.01)

(52) U.S. Cl. ............... 285/276; 384/515; 384/516; 384/523; 384/531

(58) Field of Classification Search ........... 285/276, 285/305, 322, 388, 415; 384/515, 516, 523, 384/531

See application file for complete search history.

(56) References Cited

U.S. PATENT DOCUMENTS

| 1,375,022 A | * | 4/1921 | Sellew ........................ 384/516 |
| 1,510,118 A | * | 9/1924 | Von Post .................... 384/516 |
| 2,702,202 A | * | 2/1955 | Kaiser .......................... 285/18 |
| 2,833,568 A | * | 5/1958 | Corsette ..................... 285/281 |
| 3,089,713 A | * | 5/1963 | Scaramucci .................. 285/14 |
| 3,123,413 A | * | 3/1964 | Heim .......................... 384/492 |
| 3,336,057 A | * | 8/1967 | Bloomquist ................. 285/276 |
| 3,817,560 A | * | 6/1974 | Guertin ........................ 285/90 |
| 4,035,026 A | * | 7/1977 | Replin ........................ 301/5.1 |
| 4,126,362 A | * | 11/1978 | Hamblin et al. ............ 384/526 |
| 4,324,444 A | * | 4/1982 | Buczynski et al. ......... 384/526 |
| 4,563,099 A | * | 1/1986 | Brandenstein et al. ...... 384/458 |
| 4,605,321 A | * | 8/1986 | Brandenstein et al. ...... 384/512 |
| 4,749,192 A | * | 6/1988 | Howeth ........................ 285/86 |
| 4,749,287 A | * | 6/1988 | Anguera ..................... 384/484 |
| 5,152,062 A | * | 10/1992 | Alling et al. .......... 29/898.067 |
| 5,518,322 A | * | 5/1996 | Hicks .......................... 384/544 |
| 5,538,296 A | * | 7/1996 | Horton ....................... 285/276 |
| 5,547,233 A | * | 8/1996 | Hoegger ..................... 285/276 |
| 5,632,561 A | * | 5/1997 | Chi ............................. 384/458 |
| 5,722,780 A | * | 3/1998 | Scharman ................... 384/531 |
| 5,735,552 A | * | 4/1998 | Elliott-Moore .............. 285/81 |
| 6,276,836 B1 | * | 8/2001 | Suzuki et al. ............... 384/531 |
| 6,435,725 B1 | * | 8/2002 | Smith .......................... 384/492 |
| 2002/0081049 A1 | * | 6/2002 | Buard et al. ................ 384/531 |

* cited by examiner

*Primary Examiner*—James M. Hewitt
(74) *Attorney, Agent, or Firm*—Rabin & Berdo, P.C.

(57) ABSTRACT

A non-permeable pipe connector structure, the design of which effectively prevents external material (such as vapor and miscellaneous substances, etc.) intrusion. To obstruct the intrusion of external matter into the pipe connector, a ball bearing holder is disposed at the pipe connector, enabling even greater ball bearing durability and, furthermore, free rotation. A protective flange is disposed as the bottom surface of the ball bearing holder such that when the coupling nipple and the connector base are fastened together, the protective flange effectively blocks external matter, thereby precluding entry to avert subsequent damage to the bearings. Furthermore, a rubber sealing ring sleeved onto the annular groove prevents vaporous or acid and alkaline substance intrusion into the bearings, and has safe defensive effectiveness.

2 Claims, 6 Drawing Sheets

NON-PERMEABLE PIPE CONNECTOR STRUCTURE

BACKGROUND OF THE INVENTION

1) Field of the Invention

The invention herein relates to a non-permeable pipe connector structure, the design of which effectively prevents external material (such as vapor and miscellaneous substances, etc.) intrusion.

2) Description of the Prior Art

Conventional pipe connectors typically have minute crevices along the conjoinment surfaces between their fastened pipe connectors and coupling nipples that result in adverse consequences. As such, the conjoinment surfaces are readily permeated by moisture that reaches the ball bearings and causes the drawback of ball bearing corrosion, the process continuing until the ball bearings are no longer capable of free rotation which directly affects pipe connector and coupling nipple turning capability. This is the shortcoming of the prior art.

SUMMARY OF THE INVENTION

The objective of the invention herein is to provide a non-permeable pipe connector structure, the design of which effectively prevents external material (such as vapor and miscellaneous substances, etc.) intrusion.

To obstruct the intrusion of external matter into the pipe connector, a ball bearing holder is disposed at the pipe connector, enabling even greater ball bearing durability and, furthermore, free rotation. A protective flange is disposed as the bottom surface of the ball bearing holder such that when the coupling nipple and the connector base are fastened together, the protective flange effectively blocks external matter, thereby precluding entry to avert subsequent damage to the bearings. Furthermore, a rubber sealing ring sleeved onto an annular groove prevents vaporous or acid and alkaline substance intrusion into the bearings, and has safe defensive effectiveness.

DETAILED DESCRIPTION OF THE INVENTION

The brief description of the drawings are accompanied below by the detailed description of the most preferred embodiments of the present invention.

Figure 1:
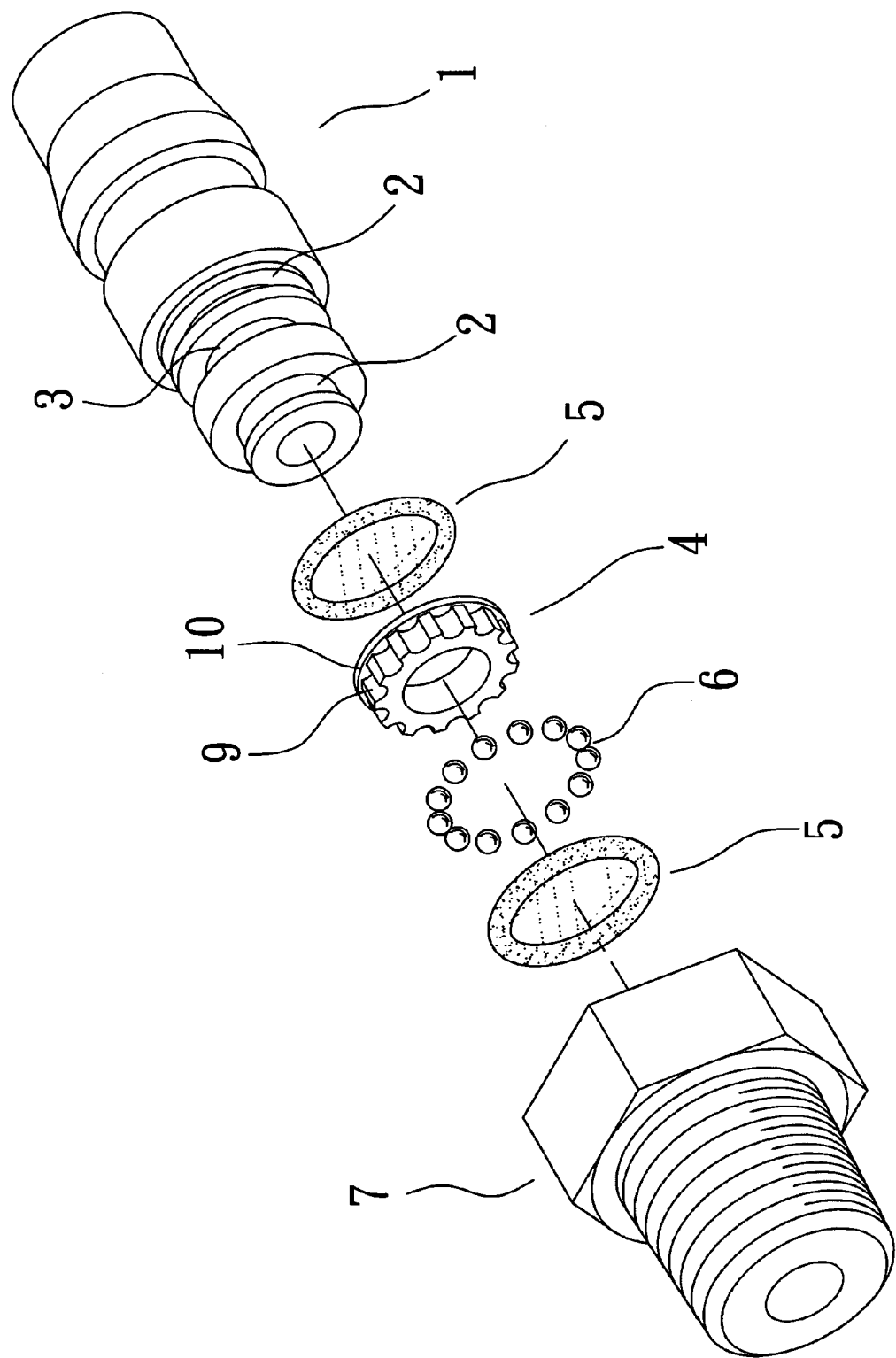
FIG. 1 is an exploded drawing of the invention herein.
Figure 2:
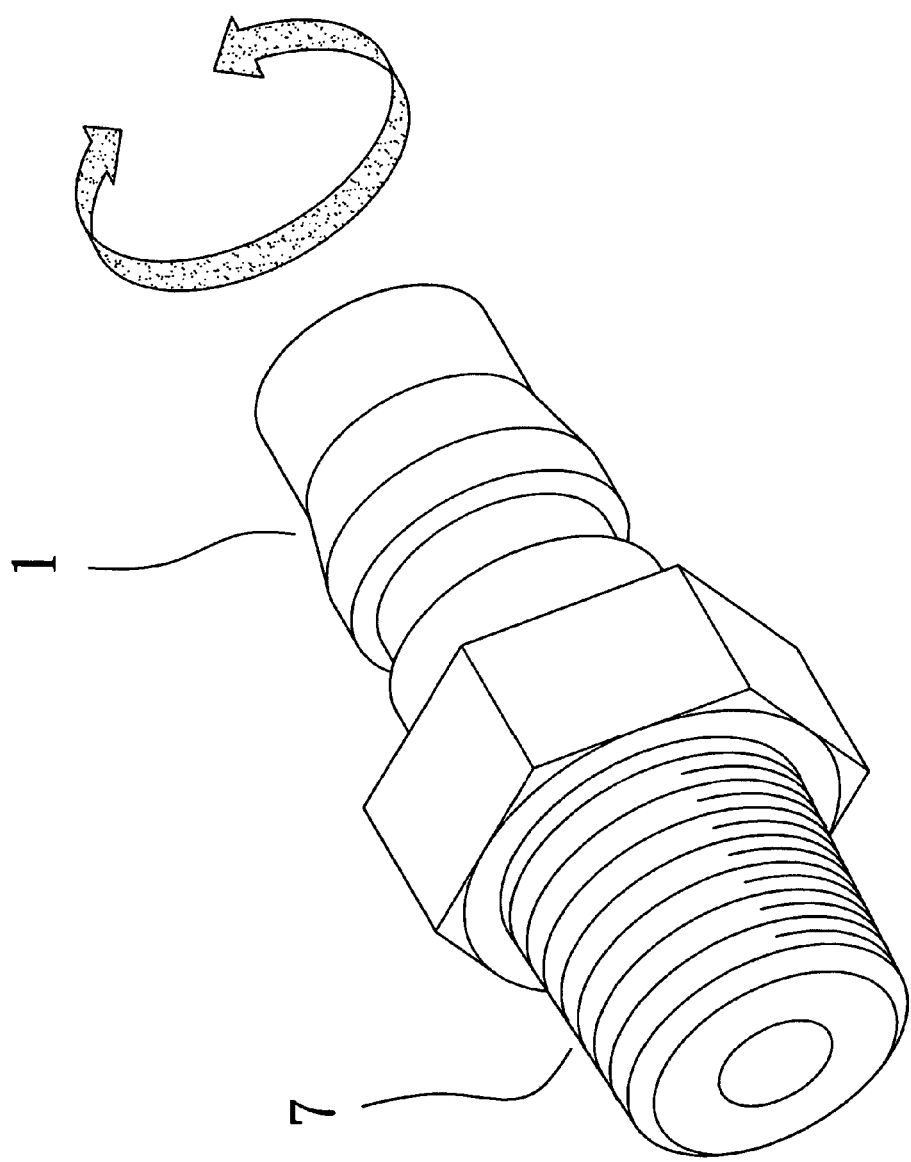
FIG. 2 is an isometric drawing of the invention herein.
Figure 3:
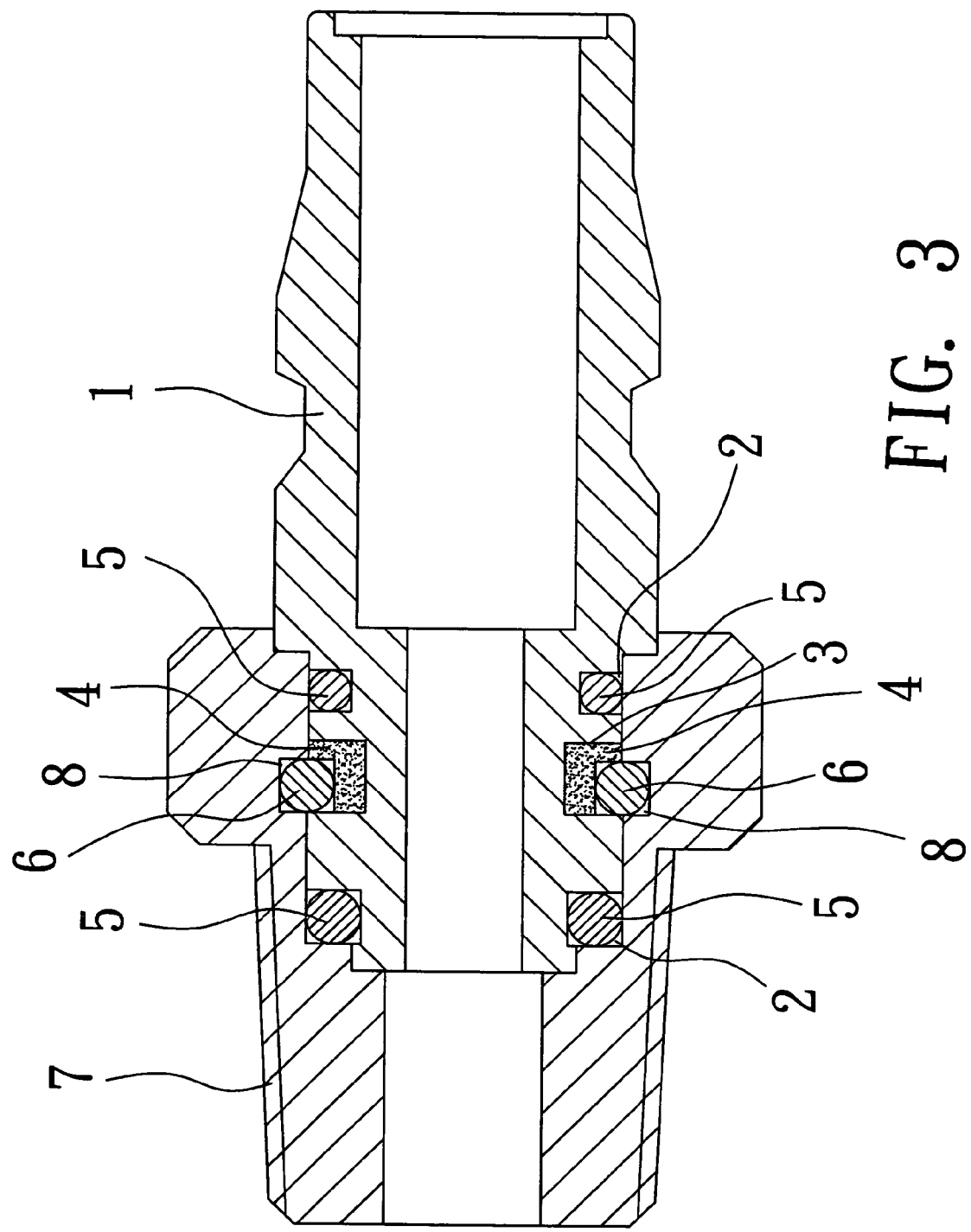
FIG. 3 is a cross-sectional drawing of the invention herein.

Refer to FIG. 1, FIG. 2, and FIG. 3, the exploded drawing, the isometric drawing, and the orthographic drawing of the invention herein.

The non-permeable pipe connector structure herein is comprised of (as indicated in FIG. 1): a coupling nipple 1 having a plurality of annular grooves 2 at one extremity and a ball bearing race 3 between one annular groove 2 and another annular groove 2. The ball bearing race 3 contains a ball bearing holder 4 inside such that a rubber sealing ring 5 is seated in the annular groove 2 and ball bearings 6 are nested on the ball bearing holder 4. A connector base 7 having a ball bearing groove 8 disposed inside that accommodates the ball bearings 6. The ball bearing holder 4 includes a plurality of socket sections 9 that locate the ball bearings 6 and a protective flange 10 constituting the bottom surface. Assembling the components enables the fastening of the coupling nipple 1 to the connector base 7 (as shown in FIG. 2 and FIG. 3), the protective flange 10 blocking external matter and thereby precluding entry to avert subsequent damage to the bearings 6. Furthermore, the rubber sealing ring 5 sleeved onto the annular groove 2 prevents vaporous or acid and alkaline substance intrusion into the bearings 6, all of which has safe defensive effectiveness. Furthermore. FIG. 1, FIG. 2, and FIG. 3 depict a quick-release connector utilized in Japan and, furthermore, the coupling nipple 1 shown is modified and of different dimensional specifications.

Figure 4:
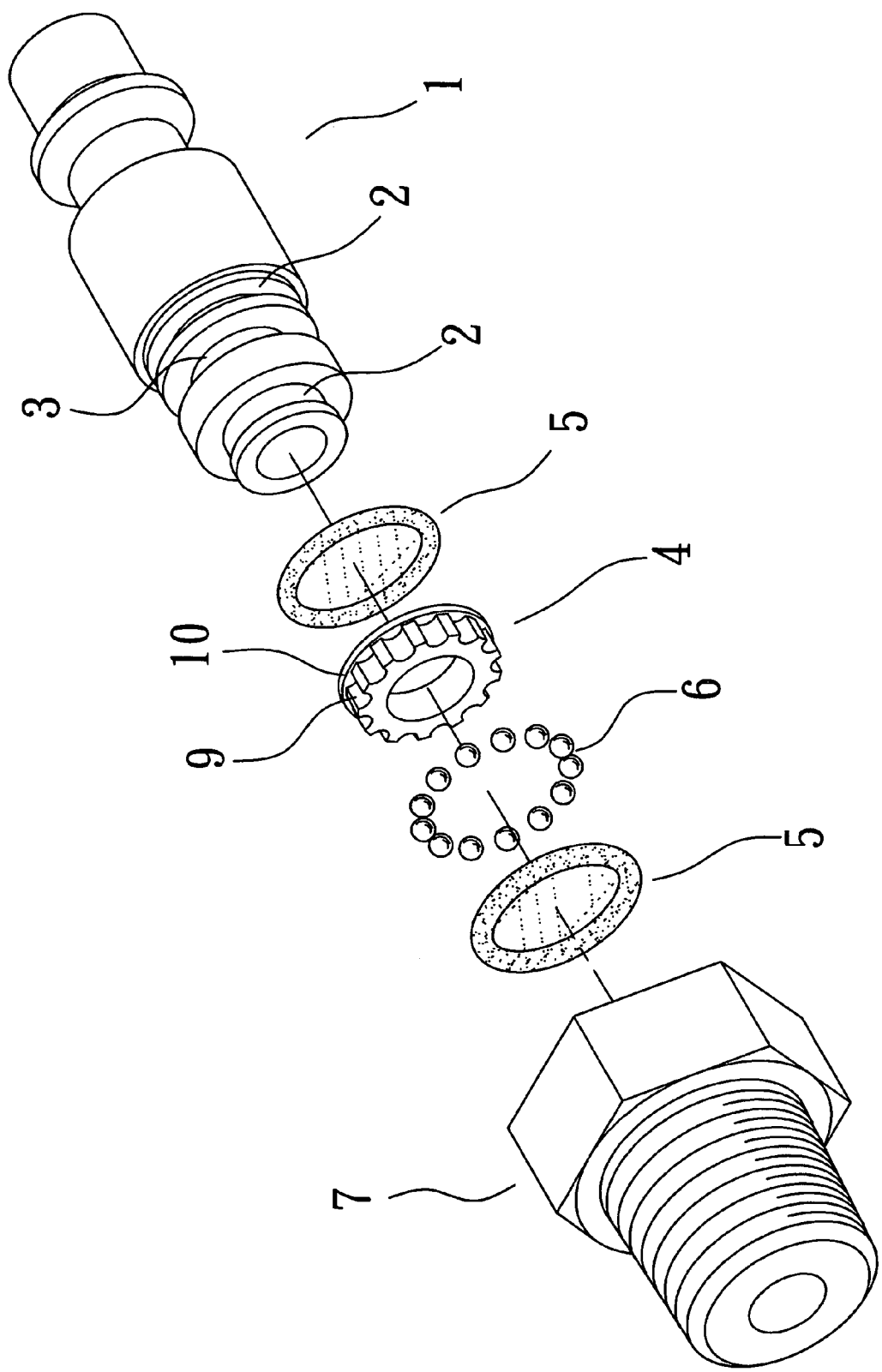
FIG. 4 is an exploded drawing of another embodiment of the invention herein.
Figure 5:
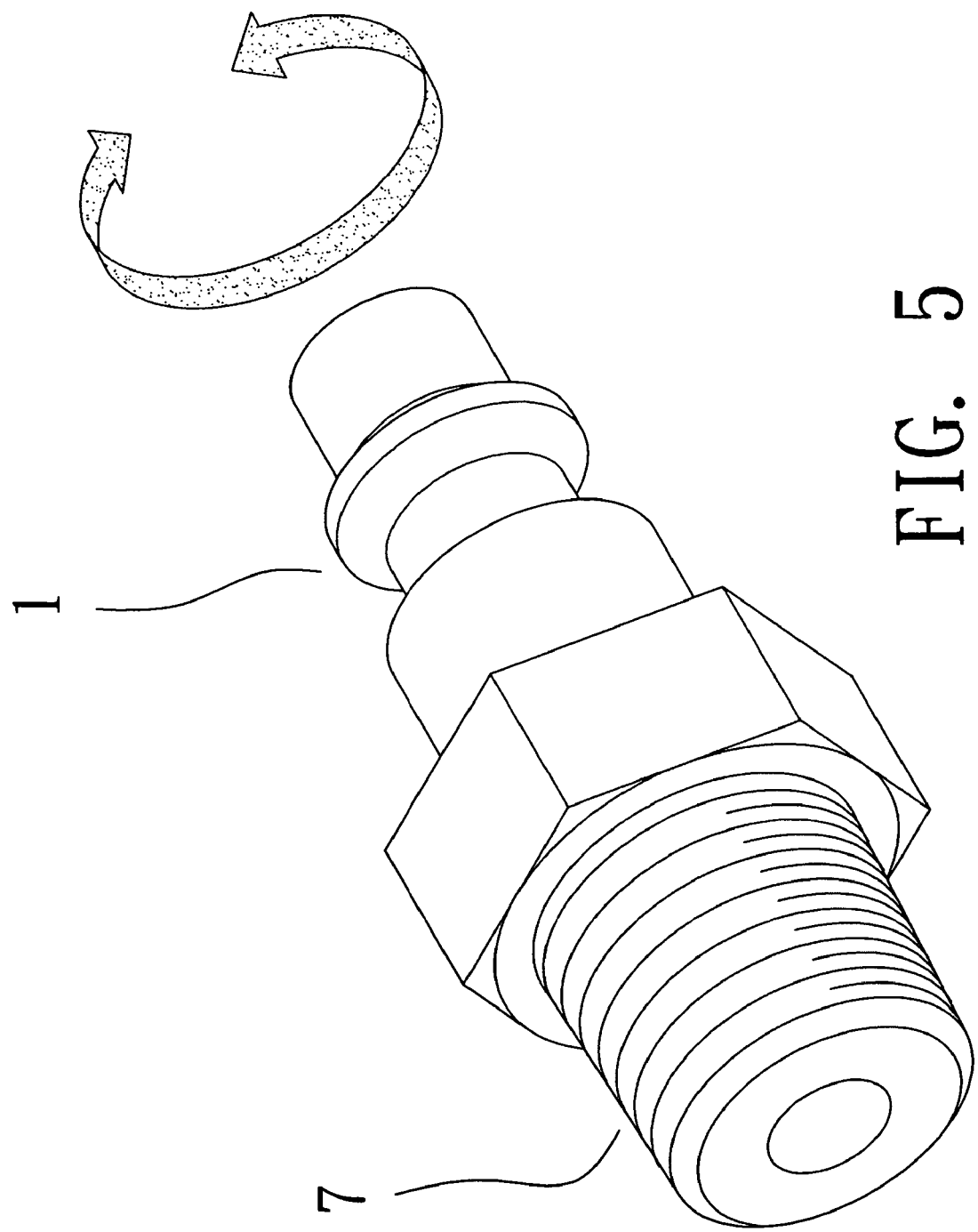
FIG. 5 is an isometric drawing of another embodiment of the invention herein.
Figure 6:
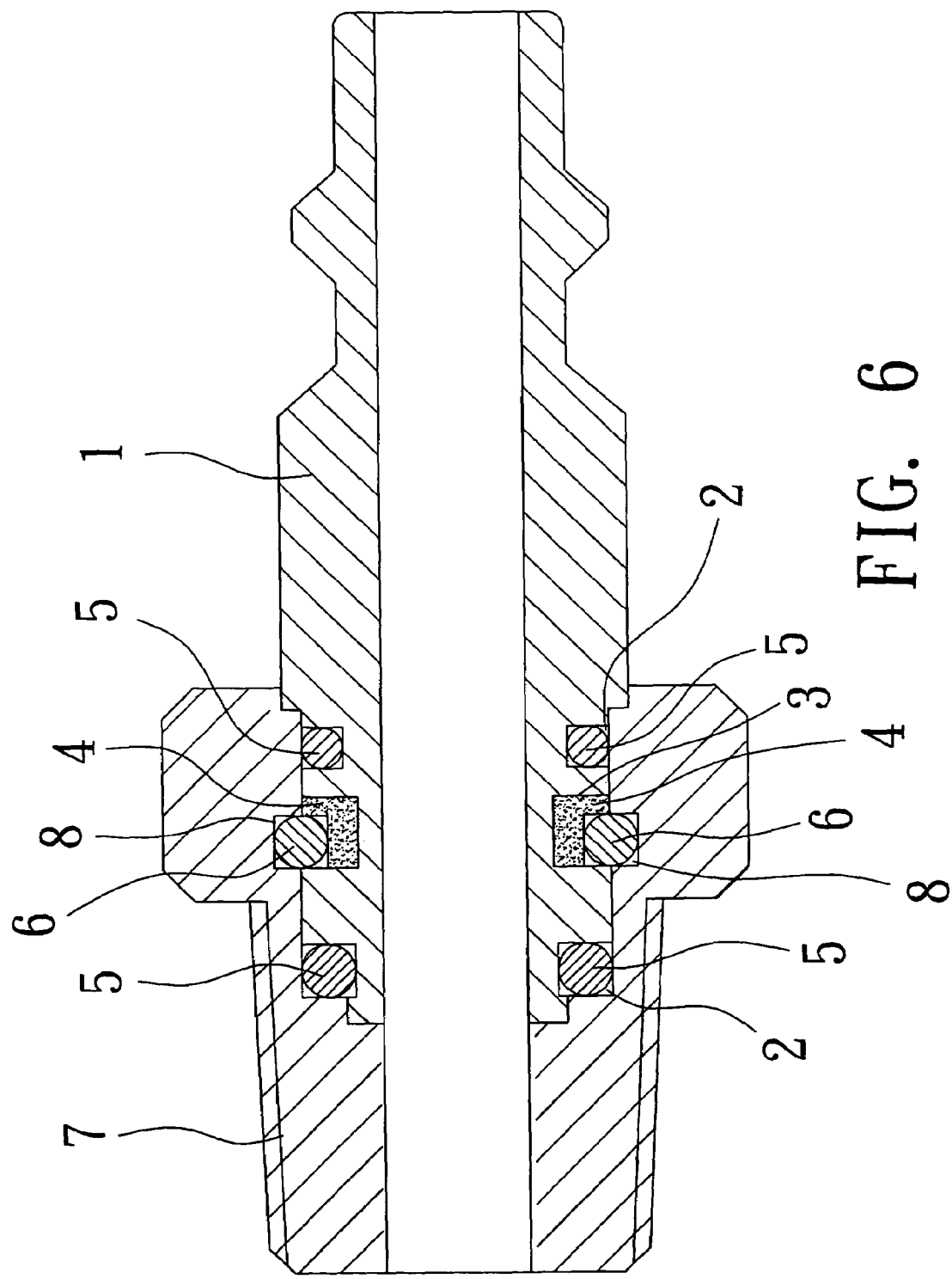
FIG. 6 is a cross-sectional drawing of another embodiment of the invention herein.

Refer to FIG. 4, FIG. 5, and FIG. 6, the exploded drawing, the isometric drawing, and the orthographic drawing of another embodiment of the invention herein.

FIG. 4, FIG. 5, and FIG. 6 illustrate a quick-release connector utilized in the United States, the coupling nipple 1 of which is modified and of different dimensional specifications, with the assembly method the same as that in FIG. 1, FIG. 2, and FIG. 3, except for the alterations to the coupling nipple 1.

As a result, after the coupling nipple 1 and the connector base 7 are fastened together, the invention herein yields the following advantages:

1. The ball bearing holder 4 of the invention herein enables even greater ball bearing durability as well as free rotation.
2. The ball bearing holder 4 protective flange 10 checks the entry of moisture from the outside, thereby preventing corrosion of the ball bearings 6.
3. The rubber sealing ring 5 seated on the coupling nipple 1 annular groove 2 is a barrier that stops vaporous or acid and alkaline substance penetration into the bearings 6 and effectively prevents the adverse consequences thereof, achieving two-way safe defensive effectiveness.

In summation of the foregoing section, since the quick-release connector of the invention herein meets the new patent requirement of progressiveness, the present invention is submitted as a new patent application.

The invention claimed is:

1. A non-permeable pipe connector structure, comprising:
   a coupling nipple having a plurality of annular grooves at one extremity and a ball bearing race between one said annular groove and another said annular groove, the ball bearing race containing a ball bearing holder, each said annular groove having a rubber sealing ring seated therein, said ball bearing holder having a plurality of ball bearings nested thereon;
   a connector base having a ball bearing groove disposed inside that accommodates the ball bearings;
   the ball bearing holder including a plurality of circumferentially-arranged, spaced-apart socket sections, each of which receives a respective ball bearing to locate the ball bearings, and a protective flange constituting a bottom surface of the ball bearing holder, the protective flange having an outer circumferential edge that contacts an inside surface of the connector base;

wherein when the coupling nipple is fastened to the connector base, the protective flange blocks external matter and thereby precludes entry to avert subsequent damage to the bearings.

2. The non-permeable pipe connector structure recited in claim 1, wherein each rubber sealing ring is sleeved onto a respective one of the annular grooves to prevent vaporous or acid and alkaline substance intrusion into the bearings, and has safe defensive effectiveness.

\* \* \* \* \*